(12) United States Patent
Zeko et al.

(10) Patent No.: US 11,931,918 B2
(45) Date of Patent: Mar. 19, 2024

(54) MANUFACTURE OF A MICROFLUIDIC COMPONENT BY ADDITIVE MANUFACTURING

(71) Applicant: Agilent Technologies, Inc., Santa Clara, CA (US)

(72) Inventors: Darijo Zeko, Ettlingen (DE); Tony Ziegler, Steinfeld (DE); Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 811 days.

(21) Appl. No.: 16/765,452

(22) PCT Filed: Nov. 19, 2018

(86) PCT No.: PCT/IB2018/059090
§ 371 (c)(1),
(2) Date: May 19, 2020

(87) PCT Pub. No.: WO2019/097490
PCT Pub. Date: May 23, 2019

(65) Prior Publication Data
US 2020/0276728 A1    Sep. 3, 2020

(30) Foreign Application Priority Data

Nov. 20, 2017 (DE) .................... 10 2017 127 315.8

(51) Int. Cl.
*B28B 1/00* (2006.01)
*B01L 3/00* (2006.01)
(Continued)

(52) U.S. Cl.
CPC ........ *B28B 1/001* (2013.01); *B01L 3/502707* (2013.01); *B33Y 10/00* (2014.12);
(Continued)

(58) Field of Classification Search
CPC ... B28B 1/001; B01L 3/502707; B33Y 10/00; B33Y 70/00; B33Y 80/00; C04B 35/10;
(Continued)

(56) References Cited

U.S. PATENT DOCUMENTS 9,463,460 B2    10/2016   Kumaran et al.
2010/0141951 A1    6/2010   Ali et al.
(Continued)

FOREIGN PATENT DOCUMENTS

CN    102371194 A    3/2012
CN    103702811 A    4/2014
(Continued)

OTHER PUBLICATIONS

National Intellectual Property Administration, PRC Chinese Office Action dated Mar. 29, 2023 for Application No. 201880072585.4 with English translation; 73 pages.
(Continued)

*Primary Examiner* — Mohammad M Ameen

(57) ABSTRACT

A microfluidic component for a sample separation apparatus includes a component body including ceramic and at least one microfluidic structure in the component body. The component body is manufactured by additive manufacturing, in particular by three-dimensional printing.

12 Claims, 4 Drawing Sheets

(51) Int. Cl.
  *B33Y 10/00* (2015.01)
  *B33Y 70/00* (2020.01)
  *B33Y 80/00* (2015.01)
  *C04B 35/10* (2006.01)
  *C04B 35/48* (2006.01)
  *G01N 30/20* (2006.01)
  *G01N 30/60* (2006.01)

(52) U.S. Cl.
  CPC .............. *B33Y 70/00* (2014.12); *B33Y 80/00* (2014.12); *C04B 35/10* (2013.01); *C04B 35/48* (2013.01); *G01N 30/20* (2013.01); *G01N 30/6095* (2013.01); *C04B 2235/666* (2013.01); *C04B 2235/667* (2013.01); *G01N 2030/202* (2013.01)

(58) Field of Classification Search
  CPC .............. C04B 35/48; C04B 2235/666; C04B 2235/667; G01N 30/20; G01N 30/6095; G01N 2030/202
  See application file for complete search history.

(56) References Cited

U.S. PATENT DOCUMENTS

| | | | |
|---|---|---|---|
| 2010/0196660 A1* | 8/2010 | Dressler | G03F 7/38 430/324 |
| 2011/0023970 A1 | 2/2011 | Rapp et al. | |
| 2011/0028293 A1 | 2/2011 | Eaton et al. | |
| 2011/0045577 A1 | 2/2011 | Bruzewicz et al. | |
| 2011/0113866 A1* | 5/2011 | Finlay | G01N 30/6095 73/61.52 |
| 2012/0009099 A1 | 1/2012 | Lin | |

FOREIGN PATENT DOCUMENTS

| | | |
|---|---|---|
| CN | 103826830 A | 5/2014 |
| CN | 105690761 A | 6/2016 |
| DE | 102005058121 A1 | 3/2007 |
| DE | 102015224756 A1 | 6/2017 |
| EP | 0309596 A1 | 4/1989 |
| GB | 2475300 A | 5/2011 |
| WO | 02063288 A1 | 8/2002 |
| WO | WO-02/063 288 A1 * | 8/2002 |
| WO | 2007063014 A2 | 6/2007 |
| WO | 2007085043 A1 | 8/2007 |
| WO | 2009003521 A1 | 1/2009 |
| WO | 2009042671 A1 | 4/2009 |
| WO | 2016063068 A2 | 4/2016 |
| WO | 2016112090 A1 | 7/2016 |
| WO | 2016188606 A1 | 12/2016 |
| WO | 2017066884 A1 | 4/2017 |
| WO | 2017157747 A1 | 9/2017 |
| WO | 2017180118 A1 | 10/2017 |

OTHER PUBLICATIONS

Jin, Zhihao et al., "Engineering Ceramic Materials," Xi'an Jiaotong University, Xue Press, Sep. 30, 2009; 33 pages; see English translation of Chinese Office Action dated Mar. 29, 2023 p. 6.
Li, Fengyun et al., "Forming and Application of Mechanical Engineering Materials," Jul. 31, 2004; 5 Pages; see English translation of Chinese Office Action dated Mar. 29, 2023 p. 6.
Chinese Office Action and Search Report dated Sep. 20, 2022 for application No. 201880072585.4; 12 pages.
PCT International Search Report and Written Opinion dated May 3, 2019 for Application No. PCT/IB2018/059090; 21 pages.
Heinrich J G, "New Developments in the Solid Freedom Fabrication of Ceramic Components", CFI/BER. DKG: Ceramic Forum International : CFI ; Berichte Der Deutschen Keramischen Gesellsc, Goeller Verlag GmbH, DE, (May 1, 1999), vol. 76, No. 5, ISSN 0173-9913, pp. 29-35, XP008008498.
Chinese Office Action and Search Report dated Aug. 9, 2023, for Application No. 201880072585.4; 15 pages.
Chinese Search Report dated Dec. 1, 2023 for Application No. 201880072585.4; 34 pages.
Cao, Xiaoming et al. "3D Printing Creative Practice," Fudan University Press, Aug. 31, 2016; pp. 189-194, 8 pages.
Zhang, Juxiang et al., "3D Printing Technology And Its Applications," National Defense Industry Press, Mar. 31, 2016; pp. 74-79, 8 pages.

* cited by examiner

MANUFACTURE OF A MICROFLUIDIC COMPONENT BY ADDITIVE MANUFACTURING

RELATED APPLICATIONS

This application is the national stage under 35 U.S.C. 371 of International Application No. PCT/IB2018/059090, filed Nov. 19, 2018, which claims priority to German Application No. DE 10 2017 127 315.8, filed Nov. 20, 2017, the entire contents of both of which are incorporated by reference herein.

TECHNICAL BACKGROUND

The present invention relates to a microfluidic component, a green body, a sample separation apparatus and a method of manufacturing a microfluidic component.

In an HPLC, typically, a liquid (mobile phase) is moved through a so-called stationary phase (for example in a chromatographic column) at a very precisely controlled flow rate (for example in the range of microlitres to millilitres per minute) and at a high pressure (typically 20 to 1000 bar and beyond, currently up to 2000 bar) at which the compressibility of the liquid is noticeable, in order to separate individual components of a sample liquid introduced into the mobile phase from each other. Such an HPLC system is known, for example, from EP 0,309,596 B1 of the same applicant, Agilent Technologies, Inc. Such an HPLC system often has one or plural switchable fluid valves.

Microfluidic components, such as for example components of fluid valves, are conventionally produced by pressing, for example, a powdery starting material in a molding tool into a desired shape.

However, the production of fluid valves (in particular rotor and/or stator components of a fluid valve) and other microfluidic components for sample separation apparatuses is still elaborate (or costly) and error-prone. One difficulty is that the microfluidic components for sample separation apparatuses must withstand high and very high pressures. Furthermore, microfluidic components, which come in contact with fluidic samples and solvents, should preferably be biologically and chemically inert. Moreover, fluids should be able to flow reliably through microfluidic structures of the microfluidic components. This becomes increasingly critical as microfluidic structures of microfluidic components become smaller and smaller. Then it can happen during a production process, for example, that microfluidic channels or the like are undesirably closed.

SUMMARY

It is an object of the invention to produce a microfluidic component having microfluidic structures with reasonable effort and high error robustness during manufacturing and operation.

According to an exemplary embodiment example of the present invention, a microfluidic component for a sample separation apparatus is established, wherein the component has a component body having ceramic and at least one microfluidic structure in the component body, wherein the component body is produced by additive manufacturing (in particular by three-dimensional printing).

According to another exemplary embodiment example, a green body or green compact for producing a microfluidic component (in particular having the features described above) is provided, wherein the green body has a preform of a component body of the microfluidic component, which preform has ceramic particles and a binding agent (or binder) that has been cured by electromagnetic radiation, and at least one microfluidic structure in the preform.

According to yet another exemplary embodiment example, a sample separation apparatus for separating a fluidic sample is provided, wherein the sample separation apparatus has a fluid drive for driving a mobile phase and the fluidic sample arranged therein, a sample separation device for separating the fluidic sample in the mobile phase, and a microfluidic component having the features described above, wherein the fluidic sample and/or the mobile phase can be conveyed (or is to be conveyed, or is to be driven) through the at least one microfluidic structure during separation.

According to a further exemplary embodiment example, a method for producing a microfluidic component (in particular having the features described above) for a sample separation apparatus is provided, wherein in the method a preform of a component body is produced by additive manufacturing, at least one microfluidic structure is formed in the preform during the additive manufacturing (in particular as part of the additive manufacturing), and the preform is transformed into the microfluidic component by firing (or baking).

In the context of the present application, the term "microfluidic component" is understood to refer to a component which, in the context of sample separation analysis, provides a functional contribution, which involves the passing of a fluid (in particular the fluid sample to be separated and/or a mobile phase) through microfluidic structures of the component. Such a microfluidic component may be fluidically coupled with one or plural other microfluidic components via fluid lines (for example capillaries). Examples for such microfluidic components are a fluidic valve, which is switchable between different fluid coupling states, or a component thereof, a sample separation device for separating a fluidic sample, a detector or a detector component for detecting the separated fluidic sample, a fluidic heat exchanger, a mixer for mixing fluids, etc.

In the context of the present application, the term "microfluidic structure" is understood in particular to refer to a branched or unbranched channel, a plurality of such channels, or another structure having dimensions in the range of micrometres to millimetres, which is through-flowable (or can be flown through) by fluid. According to an embodiment example, an internal diameter of the at least one microfluidic structure may be in a range between 0.05 mm and 1 mm, in particular in a range between 0.1 mm and 0.5 mm.

In the context of the present application, the term "additive manufacturing" or generative manufacturing is understood to refer to methods for the building-up manufacture of bodies (in particular a preform of the component body), which can be produced directly on the basis of a, for example, computer-internal data model from formless starting materials (for example a suspension, an emulsion, liquids, gels, pastes, powder, etc.) or shape-neutral (for example strip-shaped, wire-shaped, sheet-shaped) material by chemical and/or physical processes. Although often shaping processes are concerned, for additive manufacturing, no tools are required that are shaped according to the respective geometry of the body to be generated (e.g. casting moulds). Examples for additive manufacturing processes are powder bed processes, free space processes, liquid material processes and other layer construction processes, three-dimensional printing, etc.

In the context of the present application, the term "green body" or "green compact" is understood to refer, in particular, to an unfired blank that has been manufactured in ceramic technology. For example, pressed ceramic powder, powder bonded with binding agents, etc. are concerned. Such a green body and/or green compact may be dimensioned in such a way that it almost obtains the final shape by shrinkage during firing (in particular by subsequent thermal removal of one or plural components of the green body, in particular cured binding agent). Further, in particular, a "green body" or "green compact" may be understood to refer to a preform of a microfluidic component, which preform has been produced by additive manufacturing, but has not yet been transformed into a completely cured state in a firing process. In particular, in such a firing of a green body, any binding agent, which is still present in the green body and is already completely or only partially cured, can be removed totally or completely. Therefore, when firing the green body for transforming it into a microfluidic component, a reduction in volume and/or a reduction in mass may occur.

According to an embodiment example of the invention, a microfluidic component and an associated production method are established, in which the microfluidic component is provided with microfluidic structures by an additive manufacturing process. Surprisingly, it has turned out that during the selective solidification of, for example, a suspension as a starting material of the additive manufacturing method, by spatially limited energy input, for example by a laser, precisely defined microfluidic structures can be generated, which are later suited with high reliability and reproducibility for conducting a fluid during the operation of a sample separation apparatus. Namely, if volume areas of the suspension, which can serve as the starting material for producing the microfluidic component, are selectively solidified around a microfluidic structure to be formed, no undesirable residue remains inside the thus delimited microfluidic channels, which can therefore, astonishingly, remain free during additive manufacturing. Any suspension, which eventually remains in the formed microfluidic channels, can be removed easily and without problems, for example by cleaning or by applying pressure or by rinsing the channels with water or the like.

Furthermore, it has turned out that thermally conductive ceramics in the form of particles in the suspension in combined interaction with a binding agent provided there are usable without problems in the described additive manufacturing method in order to additively manufacture microfluidic components. In this way, according to exemplary embodiment examples, it is possible to establish with moderate effort a microfluidic component, which is producible easily and with precisely definable microfluidic structures as well as advantageous thermal properties. Also, with advantage, ceramic material is chemically and biologically inert, so that a corresponding microfluidic component can be exposed to aggressive solvent components of a mobile phase as well as to most various fluidic samples (e.g. biological samples) without resulting in undesired interactions between fluid and microfluidic component.

In the following, additional embodiments of the microfluidic component, the green body, the sample separation apparatus and the method are described.

According to an embodiment example, the microfluidic component may be configured as a fluid valve or a component of a fluid valve, in particular as a rotor component or a stator component of a fluid valve. In the context of the present invention, the term "valve component" is understood to refer to a valve body which can be moved relative to another valve component during a switching operation of the fluid valve. According to a preferred embodiment example, the two valve components are a rotor device and a stator device of a fluidic valve. Alternatively, however, it is also possible, for example, to manage the switching of the fluid valve by a longitudinal movement between two interacting valve components. A fluidic valve may be formed of two components, which are relatively movable with respect to each other, and which in the case of a rotor valve include a rotor component that is to be rotated and a stator component that is to be kept stationary. In the stator component, ports may be formed for the fluidic connection of the fluid valve to a fluidic environment (for example by fluid lines such as capillaries). In addition, fluidic coupling structures (such as grooves or channels) may be formed in the rotor component, which structures allow different fluidic coupling states or fluidic decoupling states between the ports in different switching states of the fluid valve. One or plural such fluid lines may also be formed in the stator component. The stator component and the rotor component can be assembled in such a way that the ports and the fluid channels can be brought in the different fluid coupling states by rotating the rotor component relative to the stator component. According to an exemplary embodiment example, the rotor component and/or the stator component may be manufactured by additive manufacturing. In other embodiments, such a fluid valve is established from two valve components that are movable relative to each other in a different way, for example from two components that can be moved longitudinally relative to each other. The described ports as well as the described fluid lines may represent microfluidic structures according to an exemplary embodiment example. They can be produced during the additive manufacturing process by simply omitting a selective solidification of the suspension exactly in the area of the later microfluidic structures. It has turned out that microfluidic components in the form of fluid valves produced by additive manufacturing meet the high requirements for mechanical robustness, tightness and reliable provision of a fluidic coupling function.

According to another embodiment example, the microfluidic component may be configured as one of a group that consists of a sample separator or part of a sample separator, a heat exchanger, and a mixer. In the case of a sample separation device for separating a fluidic sample, the microfluidic structures may correspond, for example, to a lumen of the sample separation device. In the case of a sample separation device for separating a fluidic sample, the microfluidic structures may also serve to form a heat exchanger function that is integrated in a wall of the sample separation device. In another implementation, such a heat exchanger may also be configured independently of a sample separation device and have, for example, meander-shaped or helical microfluidic structures, through which a fluid may flow to effect a heat exchange with another fluid. In a fluidic mixer, one or plural fluidic input streams are mixed together (for example at a fluidic T-point, Y-point or X-point) and then exit as a mixed fluid at an output of the microfluidic structure.

According to an embodiment example, the microfluidic component may consist of the component body. According to the embodiment described, no other component than the component body may be required to form the microfluidic component. In other words, the microfluidic component may be formed in one piece. Even very complexly produced microfluidic components having a one-piece implementation may be produced by additive manufacturing.

According to an embodiment example, the microfluidic component may be made of ceramic. If the entire component body consists only of ceramic, the special robustness of the microfluidic component during operation may be provided by the ceramic material. At the same time, such a ceramic material may show good thermal conductivity. Ceramic material is also bioinert, so that even in the presence of an aggressive chemical solvent or a biochemical sample, it is neither damaged itself nor has an undesirable effect on the sample. In addition, ceramics can be processed in powder form, whereby this powder may be provided with a binding agent (or binder) during the production of the green part of the microfluidic component, which binding agent can be selectively solidified by a laser or other energy source for producing the preform.

According to another embodiment example, the microfluidic component may have one or plural materials other than ceramics, for example residues of solidified binding agent, which have not been removed or not completely removed from the body during firing.

According to an embodiment example, the ceramic may contain or consist of aluminium oxide and/or zirconium oxide. Aluminium oxide ($Al_2O_3$) has the particular advantage of a high heat capacity. The use of zirconium oxide is particularly advantageous when a mechanically very robust and less brittle material is required. Combinations of the above and/or other powdered ceramics are also possible, for example to combine the different material properties. Also, ceramic powders having different particle sizes can be used for such reasons.

According to an embodiment example, an aspect ratio of the at least one microfluidic structure may be at least 50, in particular at least 100, and further in particular between 200 and 400. In the context of the present application, the term "aspect ratio" is understood to refer in particular to a ratio of the length of a microfluidic structure (i.e. the path length through which the fluid flows as it flows through the microfluidic structure) and a diameter of the microfluidic structure (i.e. an extension width perpendicular to the direction of flow). It has turned out that the high aspect ratios mentioned above, which are required for certain fluidic functions (e.g. a heat exchanger or a complex fluidic valve function), can be reliably and easily produced by additive manufacturing.

According to an embodiment example, an inner diameter of the at least one microfluidic structure may be in a range between 0.05 mm and 1 mm, in particular in a range between 0.1 mm and 0.5 mm. Then it can be ensured that even with tolerances of the laser or another energy source for curing, larger areas of the microfluidic structure are reliably protected against an undesired solidification. Thus, a narrowing or even complete blocking of the microfluidic structures can be avoided. At the same time, these small structure sizes are suitable for coping with the required low flux rates and limited fluid volumes of modern sample separation apparatuses.

According to an embodiment example, the at least one microfluidic structure may have at least one of a group that consists of a completely circumferentially confined microfluidic channel and a microfluidic groove. In other words, the microfluidic structure may be a microfluidic cavity (or void) in the component body. Such a cavity can be flown through by the fluid as a lumen in the interior the component body. In this context, a groove in particular is understood to refer to an elongated channel-shaped recess. In delimitation to a groove, a channel is a completely circumferentially confined cavity, which may have, for example, a circular or rectangular cross-section. However, other microfluidic structures are also possible, for example pores in a porous volume section of the component body.

According to an embodiment example, a proportion of the binding agent in the green body can be between 20 weight percent and 40% weight percent, in relation to the total weight of the green body. For example, the proportion of the binding agent may be approximately 30 weight percent. For example, a UV-curable resin may be used as a binding agent. Ceramic particles may be contained in this highly viscous binding agent to form the suspension. During the laser treatment for forming the preform of the microfluidic component, a part of the binding agent is thus solidified and then forms the preform together with the ceramic particles enclosed therein. When firing the so created green body, which is already in a desired shape, for example at least a part of the binding agent can then be expelled and the ceramic structure can be strengthened.

According to an embodiment example, the green body may be transformed (or converted) in a microfluidic component by firing (or baking). Firing can be effected by increasing the temperature in a range between 800° C. and 1800° C., especially in a range between 900° C. and 1600° C. For example, the firing may take place in a furnace. During the firing, at least a part of the binding agent that solidified during the formation of the preform may be expelled from the composite. Thereby, with shape accuracy of the component body, the volume and mass of the component body reduces as compared to the preform, while the relative ceramic content increases.

According to an embodiment example, the sample separation apparatus may be formed completely by microfluidic components having the features described above. According to this embodiment, the entire sample separation apparatus may be produced using microfluidic components having the properties described above. All microfluidic components of the sample separation apparatus may then be produced by additive manufacturing, in particular 3D printing. In this way a sample separation apparatus, in particular a liquid chromatography apparatus, may be manufactured with simple means, homogeneous material and little effort. Such an embodiment may be particularly advantageous if standardized liquid chromatography is to be performed for very specific applications, in which complicated embodiments of the modules of the sample separation apparatus may be dispensed with.

According to an embodiment example, the preform may be produced by selective curing of a curable binding agent, which is solidified together with ceramic particles. Furthermore, the process may involve removing at least a portion of the cured binding agent from the preform, whereby the microfluidic component is obtained. In particular those areas of the binding agent may be cured, where no microfluidic structures are to be produced in the finished microfluidic component. In these areas, which shall remain free of cured binding agent, the unsolidified suspension of the binding agent and the ceramic particles therefore remain, which can be easily rinsed out of the microfluidic channels or removed in another way. The removal of the cured binding agent, in whole or in part, may reduce the volume of the then finished component body compared to the volume of the preform.

According to an embodiment example, the removal may be accomplished by heating the preform, in particular to a temperature in the range between 800° C. and 1800° C. For example, the removal may be accomplished by heating in a firing furnace.

According to an embodiment example, in additive manufacturing, a suspension (i.e. a material composition comprising a liquid binding agent and solid ceramic particles) of a liquid binding agent, which is selectively curable by irradiation with electromagnetic radiation, and ceramic particles arranged therein may be selectively cured by selective irradiation with electromagnetic radiation, whereby the preform with the at least one microfluidic structure is obtained. In this way, the microfluidic component can be produced layer by layer in a corresponding apparatus by selectively solidifying suspension above a carrier (or support) to form a first layer. After lowering the support, a laser can then selectively solidify the new layer of suspension above it in order to form a second solid layer, thereby bonding it to the previously produced first layer. This may be repeated several times, so that solidification sequences of parts of suspension layers alternate with lowering sequences of the carrier. In this way, the preform of the component body may finally be obtained, which may have cured binding agent with ceramic particles contained therein.

According to an embodiment example, the curing may be carried out by irradiating the suspension by a laser, in particular a UV laser. In other embodiments, a curing may also be effected with electromagnetic radiation of other wavelengths, for example with visible light or with infrared light. The laser may be replaced by another energy source, for example a particle beam, which other energy source can scan, and thus selectively cure, a two-dimensional area.

According to an embodiment example, the at least one microfluidic structure may be obtained by selectively not curing the binding agent in a volume area, which corresponds to the at least one microfluidic structure. In other words, microfluidic structures remain wherever the suspension or other starting material has not been selectively cured.

According to an embodiment example, during the additive manufacturing, the at least one microfluidic structure may be formed in the preform with a vertical direction of extension. It has turned out to be particularly advantageous to arrange, during the additive manufacturing of the preform of the component body, the microfluidic structure to be produced parallel to a direction of emission of the laser beam. In this way, it can be avoided particularly reliably that during the manufacturing process sections of the microfluidic structure to be produced are undesirably sealed with material or that constrictions form in the area of the microfluidic structure due to undesired material hardening.

According to an embodiment example, the additive manufacturing may involve a three-dimensional printing. In three-dimensional printing, small areas of material can be printed individually on a substrate and bonded together. Thereby, a microfluidic component can be manufactured in almost any shape. By the selectively leaving free of volume sections, a channel structure can be produced in three-dimensional printing in almost any shape, size, and geometry.

According to an embodiment example, the separation device may be embodied as a chromatographic separation device, in particular as a chromatography separation column. In the case of chromatographic separation, the chromatography separation column may be provided with an adsorption medium. The fluidic sample may be retained on this medium and only subsequently be dissolved again in fractions with a sufficient amount of run agent (or solvent) (isocratic) or in the presence of a specific solvent composition (gradient), thus effecting the separation of the sample into its fractions.

The sample separation apparatus may be a microfluidic measuring apparatus, a life science apparatus, a liquid chromatography apparatus, an HPLC (High Performance Liquid Chromatography) apparatus, a UHPLC system, an SFC (supercritical liquid chromatography) apparatus, a gas chromatography apparatus, an electrochromatography apparatus and/or a gel electrophoresis apparatus. However, many other applications are possible.

The fluid pump may, for example, be configured to transport the mobile phase through the system at a high pressure, for example a few 100 bar up to 1000 bar and more.

The sample separation apparatus may have a sample injector for introducing the sample into the fluidic separation path. Such a sample injector may have an injection needle in a corresponding fluid path, which needle is coupleable to a seat, wherein the needle can be withdrawn from this seat in order to receive sample, whereby after the reinsertion of the needle into the seat the sample is arranged in a fluid path, which may be switched into the separation path of the system, for example by switching a valve, which results in the introduction of the sample into the fluidic separation path.

The sample separation apparatus may have a fraction collector for collecting the separated components. Such a fraction collector may, for example, lead the different components into different liquid containers. However, the analysed sample may also be fed to a drain container.

Preferably, the sample separation apparatus may have a detector for the detection of the separated components. Such a detector may produce a signal, which may be observed and/or recorded, and which is indicative for the presence and amount of the sample components in the fluid that flows through the system.

BRIEF DESCRIPTION OF THE FIGURES

Other objectives and many of the accompanying advantages of embodiment examples of the present invention will become easily perceptible and better understood with reference to the following more detailed description of embodiment examples in connection with the appended drawings. Features, which are substantially or functionally identical or similar, are provided with the same reference numerals.

Figure 1:
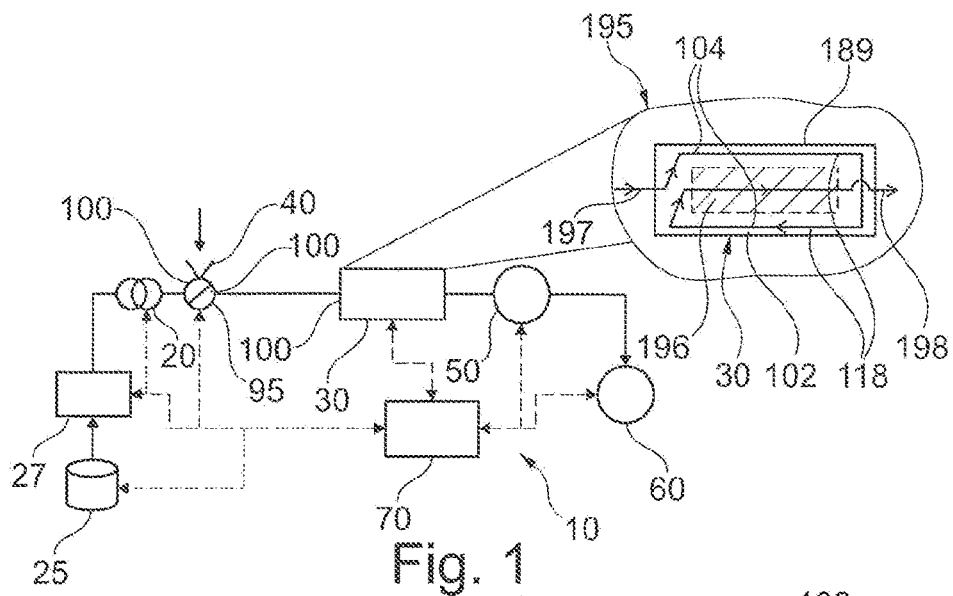
FIG. 1 shows an HPLC system as a sample separation device according to an exemplary embodiment example of the invention.

The representation in the drawings is schematic.

DETAILED DESCRIPTION

Before exemplary embodiment examples will be described with reference to the figures, some basic considerations shall be summarized, based on which exemplary examples of implementation of the invention have been derived.

According to an exemplary embodiment example, a microfluidic component, such as a component of a fluidic valve (a rotor component, a stator component, or a high-pressure seal), can be manufactured by three-dimensional printing or another additive manufacturing process. It has turned out that by such a process channels with a high aspect ratio can reliably be kept free. For this purpose, a highly viscous suspension with ceramic particles as a starting material can be used, wherein the microfluidic component can be produced by selective curing of precisely selectable volume elements of this suspension, followed by a firing (or baking).

Conventionally, a valve component of a fluidic valve can be produced by pressing a powder together with paraffin in a mold tool, wherein a shape forming is involved. A green body that has been produced in this way can then be annealed so that the green body loses volume due to the expelling of the paraffin. After a cleaning step the microfluidic component is finished. However, as microfluidic structures become smaller and smaller, such manufacturing processes reach their limits. In particular, the formation of fine channels with ever smaller dimensions is, with such a process with continued miniaturization, only possible to a limited extent and at some point no longer at all.

In order to overcome these problems, according to an exemplary embodiment example, a green body for a microfluidic component is produced by additive assembly (in particular 3D printing). For this purpose, ceramic slurry and/or a suspension can be used as starting material, which may be formed as a highly viscous and UV-curable liquid with dispersed ceramic particles. The particle size of the ceramic particles as well as a spatial resolution of a laser for curing the UV-curable binding agent determine the accuracy of the geometry that is producible. However, the mentioned parameters are easy to handle from a process engineering point of view. The liquid is cured by the laser, wherein ceramic particles still remain contained in the cured areas. A green body obtained in this way can be further processed by subjecting it to a firing process. Optionally, the component body obtained in this way can be subjected to post-processing, for example a surface grinding, a cleaning, etc. In this way, a microfluidic component for HPLC can be established, which has microfluidic channels. This may be, for example, a rotor component of a fluid valve, a stator component of a fluid valve, a column body, a heat exchanger, or a mixer. A typical channel width of such microfluidic components is approximately 0.2 mm. For such channel sizes, a flowing of the slurry into the channels by capillary forces can be prevented. A typical length of such microfluidic structures is 60 mm. An advantage of microfluidic components manufactured in this way according to embodiment examples of the invention is the particular high-pressure stability of ceramic materials, from which the microfluidic component also benefits. In addition, a ceramic can act bioinert (since it is metal-free), and therefore allows great flexibility in the handling with fluids, which are passed through the microfluidic component during operation. For example, a thickness of the microfluidic component, which is produced by additive manufacturing, can preferably be less than 1 cm, in particular less than 5 mm. A diameter of such a microfluidic component may, for example, be less than 4 cm, in particular less than 3 cm.

FIG. 1 shows the fundamental embodiment of an HPLC system as an example of a sample separation apparatus 10, as it can be used, for example, for liquid chromatography. A fluid pump as a fluid drive 20, which is supplied with solvents from a supply unit 25, drives a mobile phase through a sample separation device 30 (such as a chromatographic column), which contains a stationary phase. A degasser 27 may degas the solvents before they are fed to the fluid drive 20. A sample introduction unit 40 having a switching valve or fluid valve 95 is arranged between the fluid drive 20 and the sample separation device 30 in order to introduce a sample liquid into the fluidic separation path. The stationary phase of the sample separation device 30 is provided to separate components of the sample. A detector 50, for example having a flow cell, detects separated components of the sample. A fractionating device 60 may be provided to discharge separated components of the sample into containers that are provided for this purpose. Liquids that are no longer required may be discharged into a drain container.

A control unit 70 controls the individual components 20, 25, 27, 30, 40, 50, 60, 95 of the sample separation apparatus 10.

One or plural of the components of the sample separation apparatus 10 according to FIG. 1 are constructed as microfluidic component 100 according to an exemplary embodiment example of the invention. According to FIG. 1, as represented with the respective reference numerals 100, these are a rotor component (see reference numerals 114 in FIG. 2) and a stator component (see reference numerals 116 in FIG. 2) of the fluid valve 95 as well as a column body 189 (see the corresponding detail 195 in FIG. 1) of the sample separation device 30. Each one of these microfluidic components 100 has a component body 102 that is produced of ceramics as well as fluidic channels as microfluidic structures 104 in the ceramic component body 102. The respective component body 102 is produced by additive manufacturing of a suspension, which contains ceramic particles, with subsequent firing (see FIG. 11 and FIG. 12).

Figure 2:
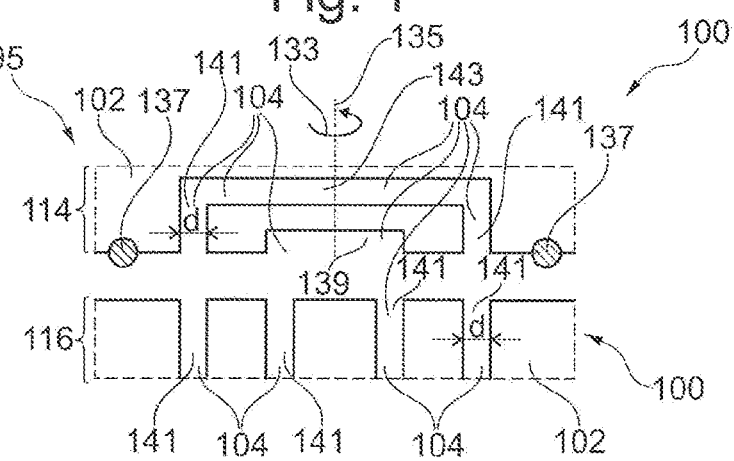
FIG. 2 shows a cross-sectional view of a stator and/or a rotor of a fluid valve as a microfluidic component according to an exemplary embodiment example of the invention.

With regard to the components of the fluid valve 95, the corresponding microfluidic structures 104 are shown and described in FIG. 2.

In the sample separation device 30, microfluidic channels or structures 104 in a substantially hollow cylindrical wall of the column body 189 are integrated fluid lines, through which a mobile phase and/or a fluidic sample can flow. This is shown schematically in FIG. 1 in the detail 195. For achieving a thermal equilibrium of a fluid flowing through the sample separation device 30, the fluid first flows from an inlet 197 of the sample separation device 30 in the direction towards an outlet 198 of the sample separation device 30, from there (for example, along a helical or meandering flow path that is not shown in detail in FIG. 1) back in the direction towards the inlet 197, in order to then flow from there in a straight line through chromatographic sample separation material 196 in a central lumen, which is circumferentially defined by the column body 189, radially within the microfluidic structure 104 back again to the outlet 198, where the fluid leaves the sample separation device 30 (see the trajectory shown schematically in the detail 195, wherein arrows indicate the direction of flow).

The sample separation device 30, shown schematically in FIG. 1, for separating a fluidic sample in the sample separation apparatus 10, thus has the column body 189, which defines the lumen for passing the fluidic sample for separating the fluidic sample. The microfluidic structure 104, which is configured as a heat exchanger 118, is integrated in the wall of the column body 189.

A fluid (for example the mobile phase and/or the fluidic sample) flows (which cannot be seen in detail in the schematic illustration in FIG. 1) when passing through the sample separation device 30, preferably at first helically within the wall of the column body 189 of the sample separation device 30, and only then flows straight through the lumen within the wall of the column body 189 of the sample separation device 30. During the helical movement along an extended trajectory, a heat exchange is effected between the helically circulating fluid in the microfluidic structure 104 and the longitudinally flowing fluid in the lumen through material having good thermal conductivity of the column body 189. During the longitudinal flow along the lumen, the fluid then flows through the sample separation device 30. In this way, a heat exchange function is integrated in the sample separation device 30.

In the case of the sample separation apparatus 10 shown in FIG. 1, in particular a part or the entire fluid valve 95 (see the description of FIG. 2), a part or the entire sample separation device 30 (see the description above), or also a part of the detector 50, of a mixer (not shown) in the area of the fluid drive 20, etc. may be embodied as a respective microfluidic component 100 according to an exemplary embodiment example of the invention, which has been produced by additive manufacturing. Preferably an aspect ratio of the at least one microfluidic structure 104 is at least 50. Herein, the aspect ratio is defined as the length of the microfluidic structure 104 divided by the diameter of the microfluidic structure 104, i.e. divided by the inner diameter of the respective capillary.

FIG. 2 shows a cross-sectional view of a fluid valve 95 according to an exemplary embodiment example of the invention. The fluid valve 95 is formed from a rotor component 114 and from a stator component 116 with an intermediate annular high-pressure seal 137.

The rotor component 114 can be rotated relative to the stator component 116 during operation, as indicated by a rotation arrow 133. An associated axis of rotation is represented by the reference numeral 135. To provide a fluid-tight connection between the stator component 116 and the rotor component 114, the high pressure seal 137 is arranged between them, and is recessed in a groove in a contact surface of the rotor component 114.

According to FIG. 2, each one of the two microfluidic components 100 of the fluid valve 95, namely the rotor component 114 and the stator component 116, consists of a respective component body 102 that is formed of ceramic. For example, the ceramic material may be aluminium oxide or zirconium oxide. Both the rotor component 114 and the stator component 116 are configured as an additive microfluidic component 100. The stator component 116 and the rotor component 114 are each manufactured by curing a UV-curable suspension of ceramic particles and a binding agent, wherein in areas of microfluidic structures 104 local solidification of the suspension is dispensed with (see FIG. 11).

The inner diameter d of some of the microfluidic structures 104 in both microfluidic components 100 shown in FIG. 2 can be 0.12 mm, for example. The microfluidic structures 104 of the rotor component 114 are partly formed as fully circumferentially defined microfluidic channels (see reference numerals 141, 143) and for another part as microfluidic grooves 139. In contrast, in the embodiment example shown, the microfluidic structures 104 of the stator component 116 are all configured as fully circumferentially defined microfluidic channels.

As shown in FIG. 2, the rotor component 114 as microfluidic structures 104 has a surface groove 139, vertical channels 141, which extend vertically into a contact surface of the rotor component 114, and horizontal channels 143, which extend parallel to the groove 139. In contrast, in the stator component 116, ports are formed in the form of vertical channels 141. Capillaries or other fluid lines not shown in FIG. 2 may be connected to these ports in order to fluidically couple the fluid valve 95 with other components of the sample separation apparatus 10.

By rotating the rotor component 114 relative to the stator component 116 during operation, different fluidic coupling states can be adjusted between the microfluidic structures 104 of the stator component 116 and the microfluidic structures 104 of the rotor component 114. These different switching states correspond to the function of the fluid valve 95 in the framework of the injecting of fluidic sample into the flow path between the fluid drive 20 and the sample separation device 30 according to FIG. 1.

Figure 3:
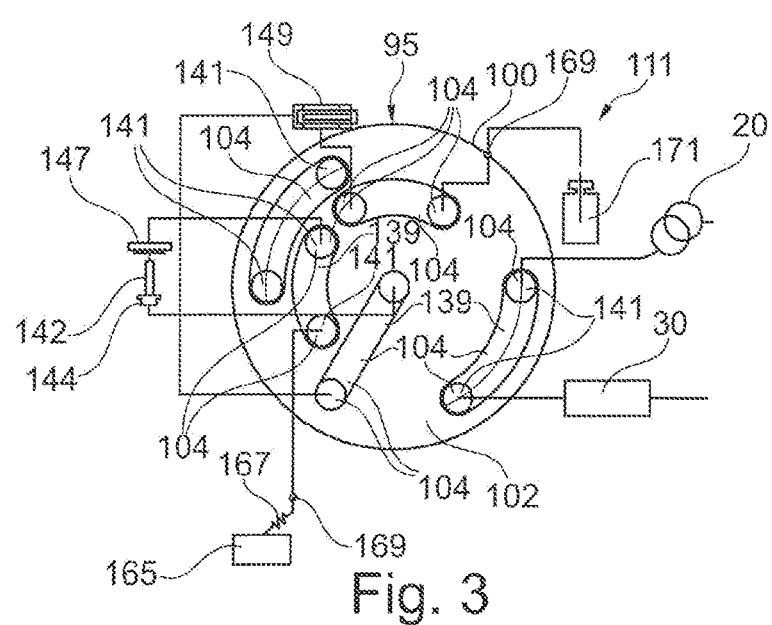
FIG. 3 shows a fluid processing device having a fluid valve as a microfluidic component according to an exemplary embodiment example of the invention.

FIG. 3 shows a fluid processing device 111 having a fluid valve 95 according to an exemplary embodiment example of the invention.

A needle 142 is located in, and can be withdrawn from (not shown), a seat 144 in order to draw in fluidic sample from a sample container (not shown) and, after returning to the seat 144, to inject it via the fluid valve 95 into a fluidic path between a fluid drive 20 and a sample separation device 30. When drawing in the sample through the needle 142, the sample may be temporarily stored in a temporary storage volume 147, a so-called sample loop. The drawing in of the sample may be effected by a dosing or metering pump 149. A piston of the latter may retract into a piston chamber for drawing in the sample and move forward for injecting it. A waste 165, a fluidic restriction 167, check valves 169, and a liquid container 171 are also shown in FIG. 3. To operate the fluid processing device 111, the fluid valve 95 is provided with grooves 139 and vertical channels 141 and optionally horizontal channels 143 as fluid connections, which may be arranged in different planes in the rotor device 114 and/or in the stator device 116. In particular, fluid lines may be offset downwardly from a paper plane of FIG. 3, while another portion of the fluid lines may also run in the paper plane of FIG. 3. Thereby, a rotational switching of the fluid valve 95 is enabled without the fluid lines in the different planes being undesiredly coupled temporarily directly with the fluid connections. Such microfluidic structures 104 are flexibly producable by additive manufacturing.

Figure 4:
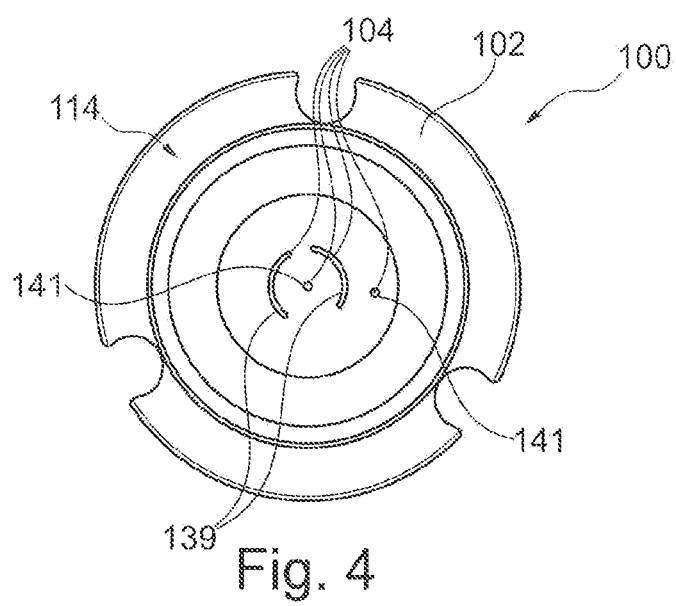
FIG. 4 shows a top view of a rotor component of a fluid valve as a microfluidic component according to an exemplary embodiment example of the invention.
Figure 5:
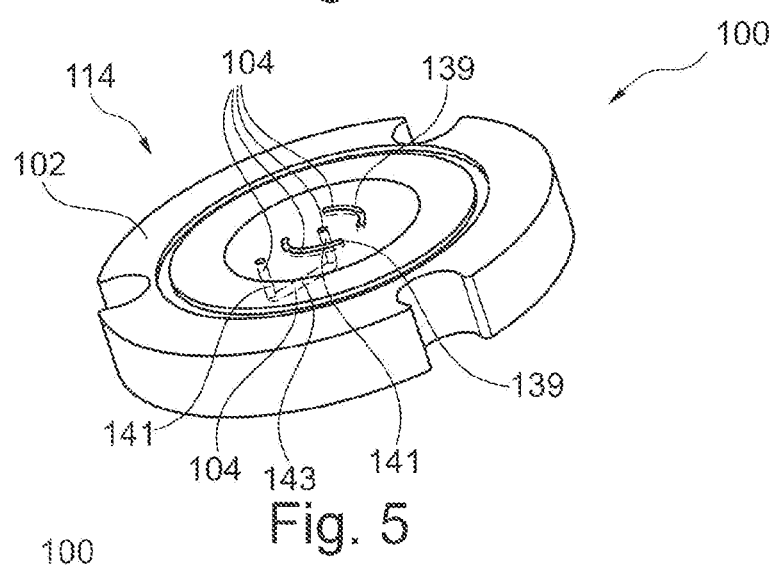
FIG. 5 shows a three-dimensional view of the rotor component illustrated in FIG. 4.

FIG. 4 shows a top view and FIG. 5 shows a three-dimensional view of a rotor component 114 of a fluid valve 95 as a microfluidic component 100 according to an exemplary embodiment example of the invention.

FIG. 4 shows a view of a detail of the rotor component 114, which has been manufactured by additive manufacturing. The microfluidic structures 104 may be manufactured even in the smallest dimensions by three-dimensional printing or another additive manufacturing process.

FIG. 5 shows in particular that not only superficial microfluidic structures 104 in the form of grooves 139 and vertical channels 141 may be formed by additive manufacturing, but that such microfluidic structures (see the horizontal channel 143) can also be provided in the interior of the component body 104.

Figure 6:
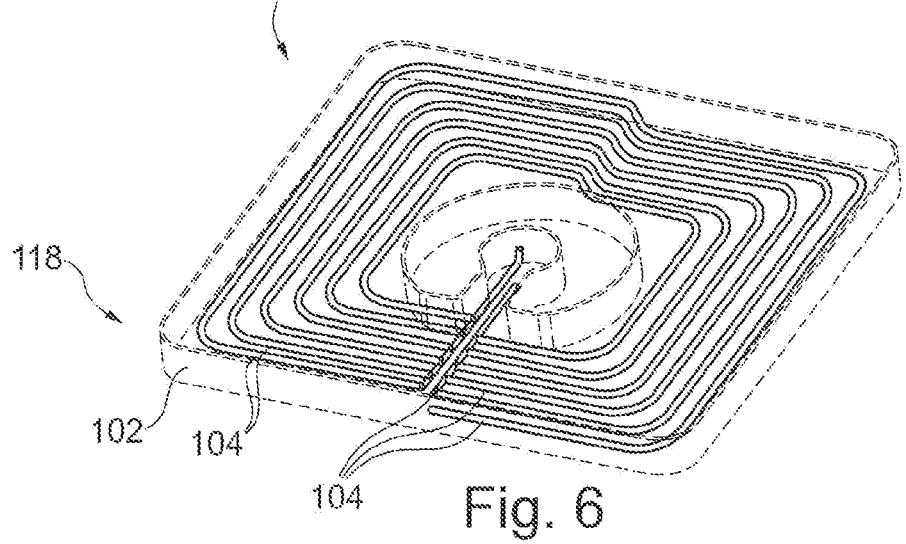
FIG. 6 shows a three-dimensional view of a heat exchanger as a microfluidic component according to an exemplary embodiment of the invention.
Figure 7:
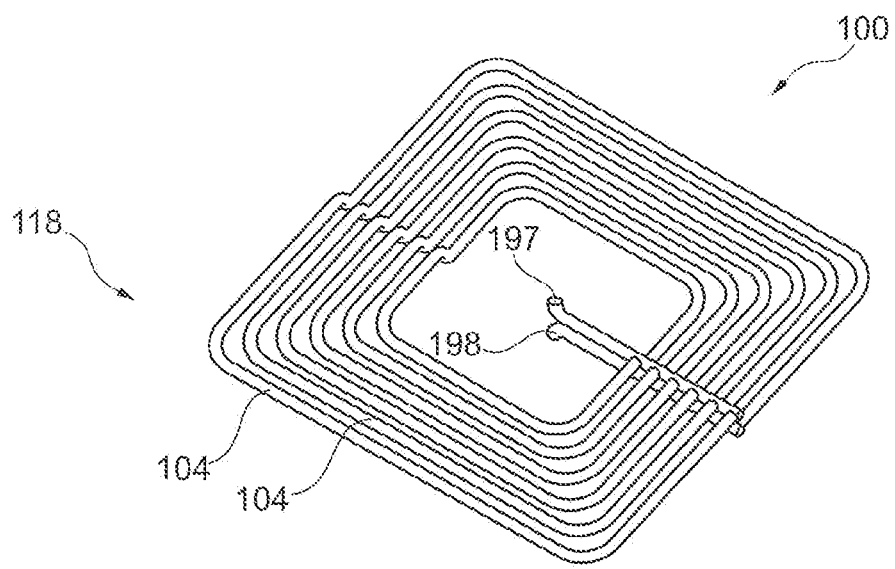
FIG. 7 shows another three-dimensional view of the heat exchanger illustrated in FIG. 6.

FIG. 6 and FIG. 7 show a three-dimensional view of a heat exchanger 118 as a microfluidic component 100 according to an exemplary embodiment example of the invention.

FIG. 6 shows the heat exchanger 118 as an example of a microfluidic component 100 according to an exemplary embodiment example of the invention, which has been manufactured by additive manufacturing. The fluid can flow through an approximately spiral trajectory and thereby carry out an efficient heat exchange. By ceramic particles forming the component body 104, not only a good pressure stability and a bioinert property are achieved, but also advantageous thermal properties of the microfluidic component 100 are obtained.

FIG. 7 shows again the heat exchanger 118 according to FIG. 6 without the component body 102, that is only the microfluidic structure 104 located inside the component body 102. Fluid may flow in through an inlet 197, and flow out through an outlet 198, or vice versa.

Figure 8:
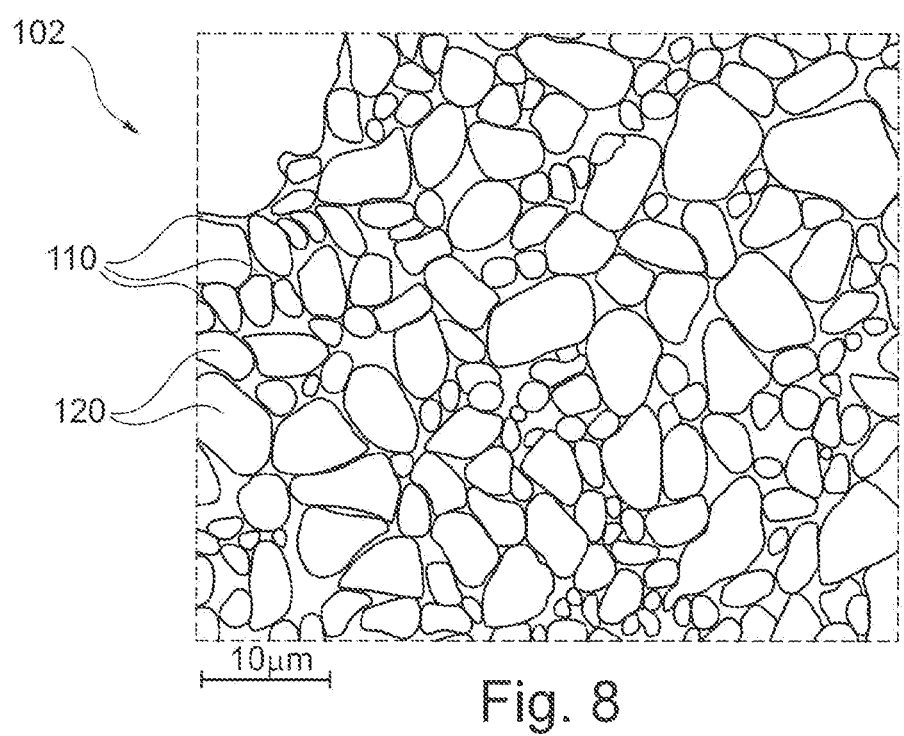
FIG. 8 shows an electron-microscopic image of a microfluidic component, which has ceramic particles and is manufactured by additive manufacturing according to an exemplary embodiment example of the invention, at one magnification.
Figure 9:
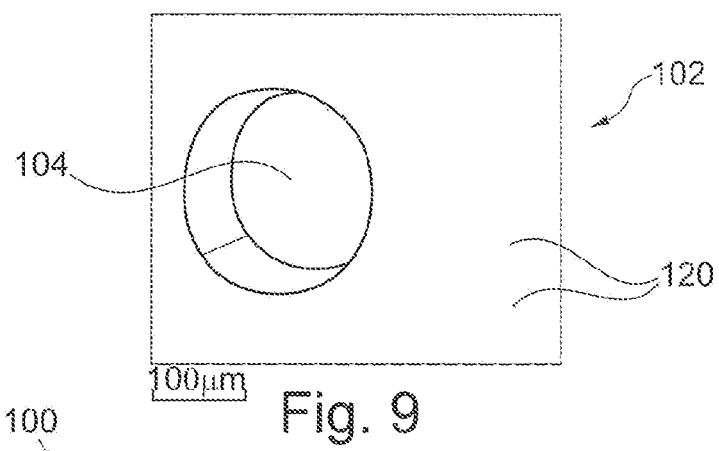
FIG. 9 shows an electron-microscopic image of the microfluidic component of FIG. 8 at a different magnification.
Figure 10:
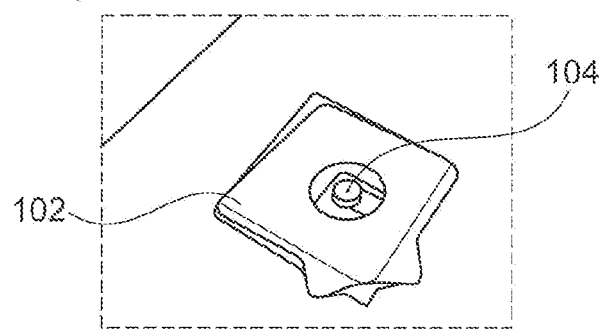
FIG. 10 shows an electron-microscopic image of the microfluidic component of FIG. 8 at another different magnification.

FIGS. 8 to 10 show electron-microscopic images of a microfluidic component 100, which has ceramic particles 120 and has been manufactured by additive manufacturing according to an exemplary embodiment example of the invention.

FIG. 8 shows an electron-microscopic image, which represents the ceramic particles 120 in a remaining matrix of a binding agent 110. It can be taken from FIG. 8 that a homogeneous material composition of the represented component body 102 is achieved.

FIG. 9 shows an image of a microfluidic structure 104 in the depicted additively-manufactured microfluidic component 100. It can be seen in FIG. 9 that the microfluidic structure 104 has a clean circular cross-section and thus a well-defined geometry.

FIG. 10 is a magnified view be component 104 according to FIG. 8 and FIG. 9.

Figure 11:
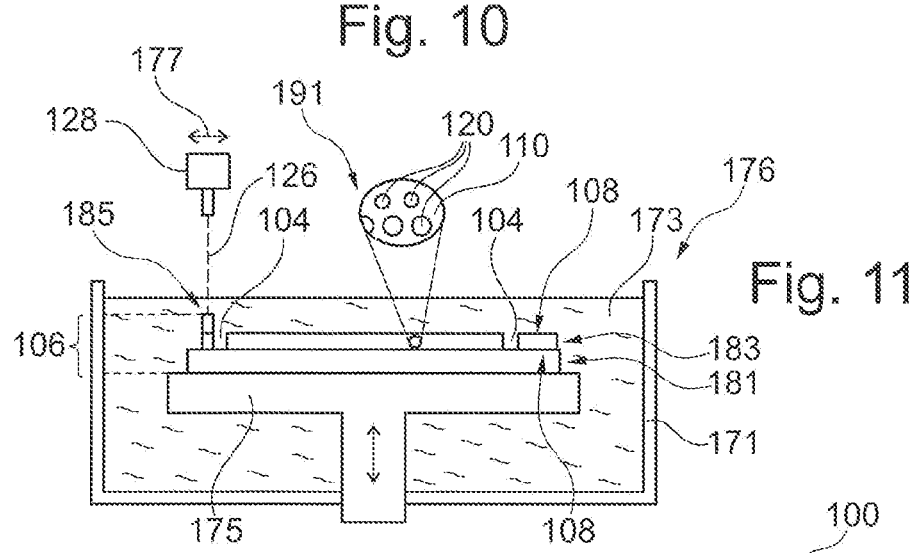
FIG. 11 shows an apparatus for producing a microfluidic component by additive manufacturing according to an exemplary embodiment example of the invention.

FIG. 11 shows an apparatus 176 for the production of a preform 108 and/or a green body 106 of a microfluidic component 100 by additive manufacturing according to an exemplary embodiment example of the invention.

The apparatus 176 represented here is a container 171, into which a suspension 173 (also known as ceramic slurry) consisting of ceramic particles 120 and a liquid but UV-curable binding agent 110 is filled (see the detail 191). A carrier 175 is located inside the container 171 and serves to support the preform 108 of the component body 102 during the forming process. A laser 128 is configured to emit a UV beam 126, and is movable as represented by the reference numeral 177. FIG. 11 also shows layers 181, 183, 185 of the preform 108 as they can be produced by selectively solidifying areas of the suspension 173 by curing the binding agent 110 therein by the UV laser beam 126. For forming the first layer 181, the carrier 175 is located just below the liquid surface of the suspension 173. The laser 128 scans the surface and solidifies those areas of the suspension 173 in which no microfluidic structures 104 but areas of the later component body 102 are to be formed. After the first layer 181 has been produced, the carrier 175 moves down by about one layer thickness. Subsequently, the laser 128 repeats the described procedure by scanning a further layer of the suspension 173 over the first layer 181. Thereby, the second layer 183 is produced by selective curing of the suspension 173 and/or, more precisely, of the binding agent 110 of the suspension 173. The procedure is repeated by lowering the support 175 a further time, forming the third layer 185 in the same way, and so on. In this way the preform 108 of the component body 102 can be produced by additive manufacturing.

By the procedure according to FIG. 11, thus a green body 106 is produced, which represents the preform 108 of the component body 102 made up of the ceramic particles 120 and the binding agent 110 cured by electromagnetic radiation (see reference numeral 126). By selective non-solidification of the suspension 173 in certain volume areas of the layers 181, 183, 185, at least one microfluidic structure 104 remains in the interior of the preform 108.

For example, a proportion of the binding agent 110 in the preform 108 may amount to between 20 percent by weight and 40 percent by weight. The rest may be ceramic material. In the additive manufacturing of the preform 108 together with the microfluidic structures 104, i.e. the green body 106, the suspension 173 consisting of the liquid binding agent 110, which is selectively curable by irradiation with electromagnetic radiation 126, and the ceramic particles 120 contained therein is selectively cured by selective irradiation. Irradiated areas of the suspension 173 are cured to form the preform 108, whereas non-irradiated areas of the suspension 173 are not cured and therefore form microfluidic structures 104.

Preferably during additive manufacturing, microfluidic structures 104 are formed in the preform 108 with a vertical direction of extension. In other words, and as shown in FIG. 11, non-irradiated sections of the individual layers 181, 183, 185 are selected so that together they form a vertically oriented microfluidic structure 104 as shown in FIG. 11. It has turned out that by this manufacturing process, the formed microfluidic structures 104 can be kept particularly reliably free from erroneously or undesirably cured binding agent 110.

Figure 12:
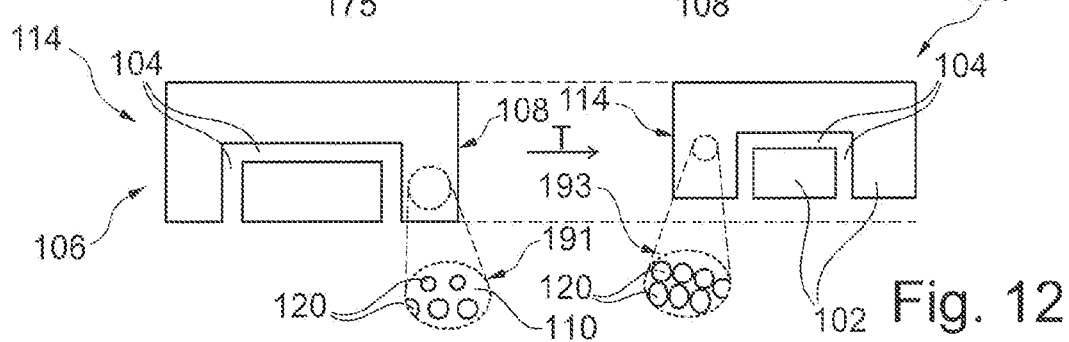
FIG. 12 shows a transition from a green body as a preform to a final shape of a microfluidic component according to an exemplary embodiment of the invention, which transition has been caused by firing.

The preform 108 completed according to FIG. 11 with the at least one microfluidic structure 104 located therein is also referred to as a green body 106. The green body 106 can then be used to produce a microfluidic component 100 as shown in FIG. 12. For this purpose, the green body 106 is transformed into a microfluidic component 100 by firing, as shown in FIG. 12.

A suspension 173 used in accordance with an exemplary embodiment of the invention may contain, in a solvent, the ceramic particles 120, the binding agent 110 and, if necessary, one or plural other additives in small quantities (for example a dispersing agent). As the solvent, for example, water and/or an organic solvent such as alcohol, may be used. Oxide ceramic particles, such as for example aluminium oxide ($Al_2O_3$) particles and/or zirconium oxide ($ZrO_2$) particles or mixtures of these and other ceramic particles can be used as ceramic particles 120. For example, the ceramic particles 120 may be contained in the suspension 173 in an amount between 10 weight percent and 90 weight percent, preferably between 40 weight percent and 60 weight percent, related to the total weight of the suspension 173. The binding agent 110 may be present in suspension 173 in an amount of between 0.1 weight percent and 40 weight percent, preferably between 0.2 weight percent and 30 weight percent, related to the solids content of the suspension. A carboxylic acid, for example, may be used as the dispersing agent.

FIG. 12 shows a transformation from a green body 106 as the preform 108 to a final shape of a microfluidic component 100 by firing according to an exemplary embodiment example of the invention. On the left side of FIG. 12, the green body 106 obtained according to FIG. 11 is shown. On the right side of FIG. 12, the finished microfluidic component 100 is shown, which is obtained by the further processing of the green body 106 as described in more detail in the following.

Once the preform 108 of the component body 112 has been produced in the manner shown in FIG. 11, it is taken out from the container 171, and may first be cleaned and dried. In the preform 108 of the component body 102, there is still contained a large amount of UV-cured binding agent 110, so that the preform 108 still has a considerable size, see FIG. 12, on the left side.

In order to transform the preform 108 in the microfluidic component 100, it is subjected to a firing process, which can be carried out in a firing furnace with strong heating. In this way, the cured binding agent 110 is expelled wholly or partially from the preform 108, thus obtaining the microfluidic component 100. The removing of at least part of the binding agent 110 from the green body 106 is thus accomplished by heating. By subjecting the preform 108 to a firing process at an elevated temperature T of, for example, 1400° C., at least part of the solidified binding agent 110 is expelled from the preform 108, which leads to a reduction in volume of the preform 108 during its transformation into the component body 104. This is illustrated in FIG. 12. As is shown in a detail 191 in FIG. 11 and FIG. 12, the preform 108 is formed from the ceramic particles 120 in a matrix of the solidified binding agent 110. As is shown in a detail 193 in FIG. 12, after firing the binding agent 110 is at least partially removed, so that densely packed ceramic particles 120 remain as the material of the component body 102.

The ceramic green body or green body 106 may be fired at temperatures that result from the ceramic materials used. For example, the firing temperature may be between 900° C. and 1800° C., in particular between 1100° C. and 1700° C., further in particular between 1100° C. and 1400° C.

It should be noted that the term "comprising" does not exclude other elements, and that the terms "a" or "an" do not exclude a plurality. Also, elements, which are described in connection with different embodiment examples, can be combined. It should also be noted that reference numerals in the claims should not be construed as limiting the scope of protection of the claims.

The invention claimed is:

1. A method for manufacturing a microfluidic component for a sample separation apparatus, the method comprising:
producing a preform of a component body comprising a suspension of a liquid binding agent and ceramic particles by additive manufacturing, wherein the additive manufacturing is performed without the use of tools having shapes that correspond to a geometry of the component body;
forming at least one microfluidic structure in the preform during the additive manufacturing; and
transforming the preform into the microfluidic component by firing.

2. The method according to claim 1, comprising:
manufacturing the preform by selectively curing the curable binding agent; and
removing at least a portion of the cured binding agent from the preform, whereby the microfluidic component is obtained.

3. The method according to claim 2, wherein the removing is accomplished by a step selected from the group consisting of: heating the preform; and heating the preform to a temperature in a range between 800° C. and 1800° C.

4. The method according to claim 1, wherein the liquid binding agent is a curable liquid binding agent, and the producing and forming in the additive manufacturing comprises selectively curing by irradiation with electromagnetic radiation the suspension, whereby the preform with the at least one microfluidic structure is obtained.

5. The method according to claim 4, wherein the curing is carried out by a step selected from the group consisting of: irradiating the suspension with a laser; and irradiating the suspension with a UV laser.

6. The method according to claim 2, wherein the at least one microfluidic structure is obtained by selectively not curing the binding agent in a volume range, which corresponds to the at least one microfluidic structure.

7. The method according to claim 1, wherein the additive manufacturing comprises a three-dimensional printing.

8. The method according to claim 1, wherein during the additive manufacturing the at least one microfluidic structure in the preform is formed with a vertical direction of extension.

9. The method according to claim 1, wherein the microfluidic component is configured as one selected from the group consisting of: a fluid valve; a component of a fluid valve; a rotor component of a fluid valve; a stator component of a fluid valve; a sample separation device; a part of a sample separation device; a heat exchanger; and a mixer.

10. The method according to claim 1, wherein the ceramic comprises aluminum oxide and/or zirconium oxide.

11. The method according to claim 1, wherein the at least one microfluidic structure comprises at least one of the following features:
wherein an aspect ratio of the at least one microfluidic structure is in a range selected from the group consisting of: at least 50; at least 100; and between 200 and 400;
wherein an inner diameter of the at least one microfluidic structure is in a range selected from the group consisting of: between 0.05 mm and 1 mm; and between 0.1 mm and 0.5 mm;
wherein the at least one microfluidic structure comprises at least one selected from the group consisting of: a completely circumferentially confined microfluidic channel; and a microfluidic groove.

12. The method according to claim 2, wherein, before the transforming, a proportion of the binding agent is between 20 weight percent and 40 weight percent, related to the total weight of the preform.

* * * * *